June 4, 1946.　　　R. TOWNSEND　　　2,401,524
CLUTCH
Filed Dec. 11, 1944

INVENTOR
ROY TOWNSEND
BY
ATTORNEYS

Patented June 4, 1946

2,401,524

UNITED STATES PATENT OFFICE 2,401,524

CLUTCH

Roy Townsend, West Bend, Wis.

Application December 11, 1944, Serial No. 567,669

2 Claims. (Cl. 192—48)

My invention refers to clutches and it has for its primary object to provide two sets of conical rollers for selectively clutching the hubs of a pair of wheels, the same being controlled by manipulating a sleeve engaging the sets of rollers back and forth, the said sleeve being mounted upon the driven shaft.

With the above and other minor objects in view, the invention consists in certain peculiarities of construction and combination of parts, as will be fully set forth hereinafter with reference to the accompanying drawing, and subsequently claimed.

Figure 1:
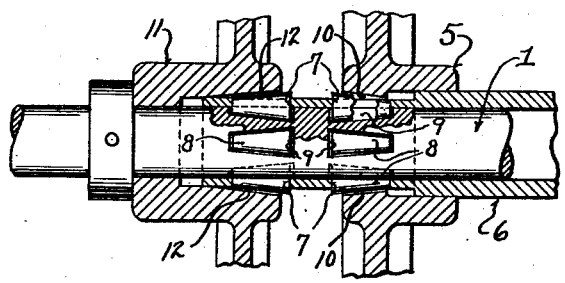
Fig. 1 represents a sectional elevation of a clutch embodying the features of my invention, the same being shown with the hub members of a pair of wheels.

Referring by characters to the drawing, 1 indicates a driven shaft. A hub 5 is journaled upon a clutch sleeve 6, which sleeve is manually slidable upon the driven shaft 1.

For convenience in construction, the outer end of the sleeve 6 is slightly reduced in diameter and provided with two sets of oppositely tapered openings, 7 for the reception of two series of conical rollers 8, which are spaced apart and tapered or inclined in opposite directions from each other.

The two series of rollers 8 are revoluble in pockets 9, formed in the shaft 1, the said pockets conform to the conical surfaces of the rollers and are slightly longer than said rollers, to permit longitudinal movement thereof.

It will be noted that the hub 5 of the said roller is provided with a slightly tapered annular face 10 in alignment with one set of the rollers, which rollers project above the surface of the clutch sleeve 6.

Loosely mounted upon the shaft 1 opposite the hub 5 of the head, is a hub 11 of a wheel. This hub is also provided with a tapered annular internal face 12.

When the hub 11 of the gear wheel is locked to the shaft by the clutch mechanism, it will impart rotation thereto.

Figure 2:
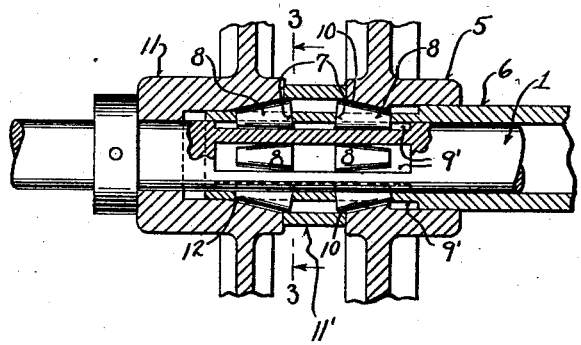
Fig. 2 is a similar sectional elevation illustrating a slightly modified form of my invention.
Figure 3:
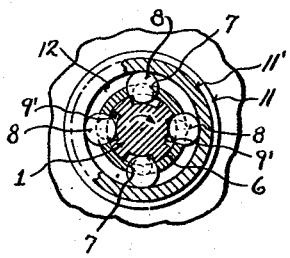
Fig. 3 is a cross section of the same, the section being indicated by line 3—3 of Fig. 2.

Referring to Figures 2 and 3 of the drawing, the shaft 1 is provided with a series of longitudinal disposed channels or pockets 9' cut parallel to the shaft axis, into which the two sets of rollers 8 rest and project above the periphery of the shaft. The reduced end of the clutch sleeve 6 is similar to that previously described with particular reference to Figure 1 of the drawing, having openings 7 therein for engagement with the ends of the conical rollers.

Encasing the rollers is a loose sleeve 11', the ends of which engage the ends of the hubs 5 and 11, serving also as a spacer therefor.

Referring now to the cross-sectional view Fig. 3 illustrating the shaft channels 9', when said shaft is rotated in the direction of the arrow, it is apparent that the movement of the sleeve in selected opposite directions will clutch the hubs and when said sleeve is moved in intermediate position, it will free the hubs from the clutched engagement with the shaft.

Briefly, when the sleeve is shifted from right to left, it will cause the rollers to lock the hub 11 to the shaft, and when said sleeve is reversely shifted, the second set of rollers will lock the hub 5 to said shaft.

While I have specifically described two forms of my invention in detail, it is understood that I may vary the structure with a fair interpretation of the claims.

I claim:

1. A clutch comprising a shaft having elongated tapered grooves in its periphery, paralleling the axis of the shaft, conical rollers loosely mounted in the grooves and projecting above the periphery of the shaft, a sleeve mounted upon the shaft having recesses therein engaging the ends of the rollers, a hub loosely mounted upon the shaft having a tapered recess therein engageable with the conical rollers.

2. A clutch comprising a shaft having spaced sets of tapered grooves in its periphery, paralleling the axis of the shaft, conical rollers loosely mounted in each set of grooves and projecting above the periphery of the shaft, a sleeve mounted upon the shaft having recesses therein engaging the ends of each set of the rollers, a pair of loose hubs mounted upon the shaft, each having a tapered recess therein engageable with the conical rollers, and means associated with the sleeve for selectively moving the same back and forth, whereby the hubs are alternately locked to said shaft.

ROY TOWNSEND.